United States Patent [19]

Gray

[11] Patent Number: 4,748,654
[45] Date of Patent: May 31, 1988

[54] REMOTE SUPERVISORY MONITORING AND CONTROL SYSTEM

[76] Inventor: William Gray, 1212 Ingleside Ave., McLean, Va. 22101

[21] Appl. No.: 853,893

[22] Filed: Apr. 21, 1986

[51] Int. Cl.$^4$ .................................... H04M 11/00
[52] U.S. Cl. .................................... 379/40; 379/41; 379/104; 379/105
[58] Field of Search ............ 379/40, 41, 46, 51, 379/88, 106, 105, 104; 340/522, 527, 529

[56] References Cited

U.S. PATENT DOCUMENTS

| | | | |
|---|---|---|---|
| 3,820,074 | 8/1974 | Toman | 379/104 X |
| 3,925,622 | 12/1975 | Robinson | 379/51 X |
| 4,095,050 | 6/1978 | Beachem et al. | 379/105 X |
| 4,482,785 | 11/1984 | Finnegan et al. | 379/41 X |
| 4,490,986 | 1/1985 | Paddock | 340/527 |
| 4,493,947 | 1/1985 | Loveless | 379/51 X |
| 4,510,350 | 4/1985 | Wagner et al. | 379/51 X |
| 4,554,418 | 11/1985 | Toy | 379/88 |
| 4,558,181 | 12/1985 | Blanchard et al. | 379/40 |
| 4,578,540 | 3/1986 | Borg et al. | 379/40 |
| 4,665,544 | 5/1987 | Honda et al. | 379/104 |

FOREIGN PATENT DOCUMENTS

| | | | |
|---|---|---|---|
| 51383 | 5/1982 | European Pat. Off. | 379/51 |
| 59-221142 | 12/1984 | Japan | 379/51 |
| 2106354 | 3/1983 | United Kingdom | 379/40 |
| 2138981 | 10/1984 | United Kingdom | |

OTHER PUBLICATIONS

Pagetek, Inc. Raleigh N.C., Brochure Entitled "New From PageTek . . . Protect Remote Transmitter Sites! Protek Means Less Down-Time & Fewer Service Calls, You Get Full Remote Control,".
Pagetek, Inc., Raleigh, N.C., "Protek Automatic Remote Site Protector" Technical Description.
Capital Controls Company, Inc., "Advanced Series 1520 Automatic Dialing Alarm Monitor", Instruction Manual Pub. No. 385-2, Published Mar. 1985, Bulletin B3815203, © 1985.
Butler National Corp., "ADAS II", Operation Manual, Revision o, Sept. 1982.
Fire Burglary Instruments, Inc., Hauppauge, NY, Brochure, ". . . With Voice Response Secure-Fone You'll Have The Sales Edge", © 1985.
Fire Burglary Instruments, Inc., Hauppauge, NY, Brochure, "Secur-Fone. Security Made Simple", © 1986.

Primary Examiner—Keith E. George
Attorney, Agent, or Firm—Leydig, Void & Mayer

[57] ABSTRACT

A supervisory monitoring and control system is described which provides for responding to a push-button telephone output from another location for changing operating parameters at the supervised site. In response to the received keyed telephone signal the system provides complete status of monitor and control ports plus any active alarms which have occurred. The foregoing information can be communicated by means of a voice synthesizer or supplied to a printer or the like.

4 Claims, 4 Drawing Sheets

REMOTE SUPERVISORY MONITORING AND CONTROL SYSTEM

BACKGROUND OF THE INVENTION

This invention relates to supervisory monitor control systems having particular application to uses in remote locations and which do not require the use of personnel at that remote location. More particularly, the invention relates to systems of the foregoing nature which are programmable, end which can respond to digital or analog signals to effect both programming and operation.

Supervisory control systems of the type here in question generally electrically monitor various operation parameters at an unmanned operating site. If a deviation in a desired range of parameters is noted, the systems conventionally generate alarms which are then transmitted to a central location. At the central location, there is usually a control center which contains equipment capable of displaying the existence of an alarm and/or various operating parameter levels on command. This control center is, as well, generally equipped with a control system which can be manipulated by an operator to correct defects in or minimize the effects of malfunctions in the monitored equipment at the remote site. This form of operation has as its ultimate purpose the improvement of performance in an unmanned equipment site. In addition, the removal of the necessity for sending a repair crew or operating personnel to the remote site provides a major cost savings.

In conventional systems the central location is generally equipped with a computer having appropriate peripheral equipment and connected to the remote location, usually through leased telephone lines. Generally speaking, the equipment at the remote location is specifically programmed to operate in a given manner in response to various conditions, and to produce corresponding signals. In order to effect a change in monitoring operations the monitoring equipment at the remote site must be reprogrammed there, or perhaps, changes in the programing of the remote equipment can be effected by means of the computer at the central location through the aforementioned telephone lines. As might be expected the central control center must be manned at all times to insure the proper operation of the system.

More recent developments in systems of this nature have permitted such supervisory monitor and control systems to use the telephone dial-up network and a standard push-button telephone to communicate with the remote site. These developments include the provision of voice synthesis equipment at the remote site to communicate information to the user, and the operator can use push-buttons on his telephone to produce dual tone, multi-frequency (DTMF) signals to enter various user access codes to set control switches end the like at the remote site. Again, however, programming of the monitoring and alarm equipment at the remote site must still be done at a central location using a computer found at that location. Consequently, in the prior art systems, despite the fact that the remote supervisory system is accessible via a push-button telephone, if errors in operation should be noted, the system cannot be reprogrammed from that push-button telephone to make the necessary corrections or changes.

It is an object of this invention to provide an unmanned, remote supervisory monitor and control system which is accessible via the public telephone network and which can be programmed from a push-button telephone at any location in a public telephone network.

It is another object of this invention to provide an umanned, remote supervisory monitor and control system which permits retrieval of archival data concerning the operation of the system being monitored.

Another object of this invention is to provide a system meeting the foregoing objects and which in addition to providing voice synthesized outputs concerning existing condtions, provides a voice synthesized output containing a menu to guide a user through the operation of the system.

Another object of this invention is to provide means for evaluating alarm criteria and to prioritize alarm reporting which reduces false alarms and nuisance alarms.

Another object of this invention is to provide means for reporting alarm and status information to a plurality of users using synthesized voice and/or printers using data transmission.

SUMMARY OF THE INVENTION

The foregoing and other objects are obtained in an unmanned, remote supervisory control system providing means for responding to a push-button telephone output for changing operating parameters at the supervised site. The operator need only access the system of the invention through the use of a valid password to enter new parameters over any push-button telephone. The system contains means for responding to any push-button telephone anywhere to provide complete status of monitor and control ports plus active alarms, in addition to the programming functions described above.

Conventional digital and analog monitoring devices are used to monitor at a remote site such parameters as signal strengths, temperatures, power, pressure, switch closures and the like. These are compared to high/low thresholds and normal closure positions to determine alarm conditions. Should there be a measured condition which exceeds one of the thresholds, the system contains means for dialing in sequence up to six different telephone numbers to attempt to alert operating personnel of an alarm condition. When a telephone is answered at one of those locations the condition is described by a synthesized voice to the user after the supervisory control system receives a valid password keyed in by the user.

The system according to the invention contains means for storing data concerning a history of previous alarms which is made available to an operator, again from any push-button telephone, upon receipt of the appropriate password. Printer means can be provided for logging every transaction, for example, noting location, time, date, port, condition and the operator involved. The printer may be located at the supervised site and/or two remote locations on any telephone with an appropriate modem.

DETAILED DESCRIPTION OF THE DRAWINGS

Figure 1:
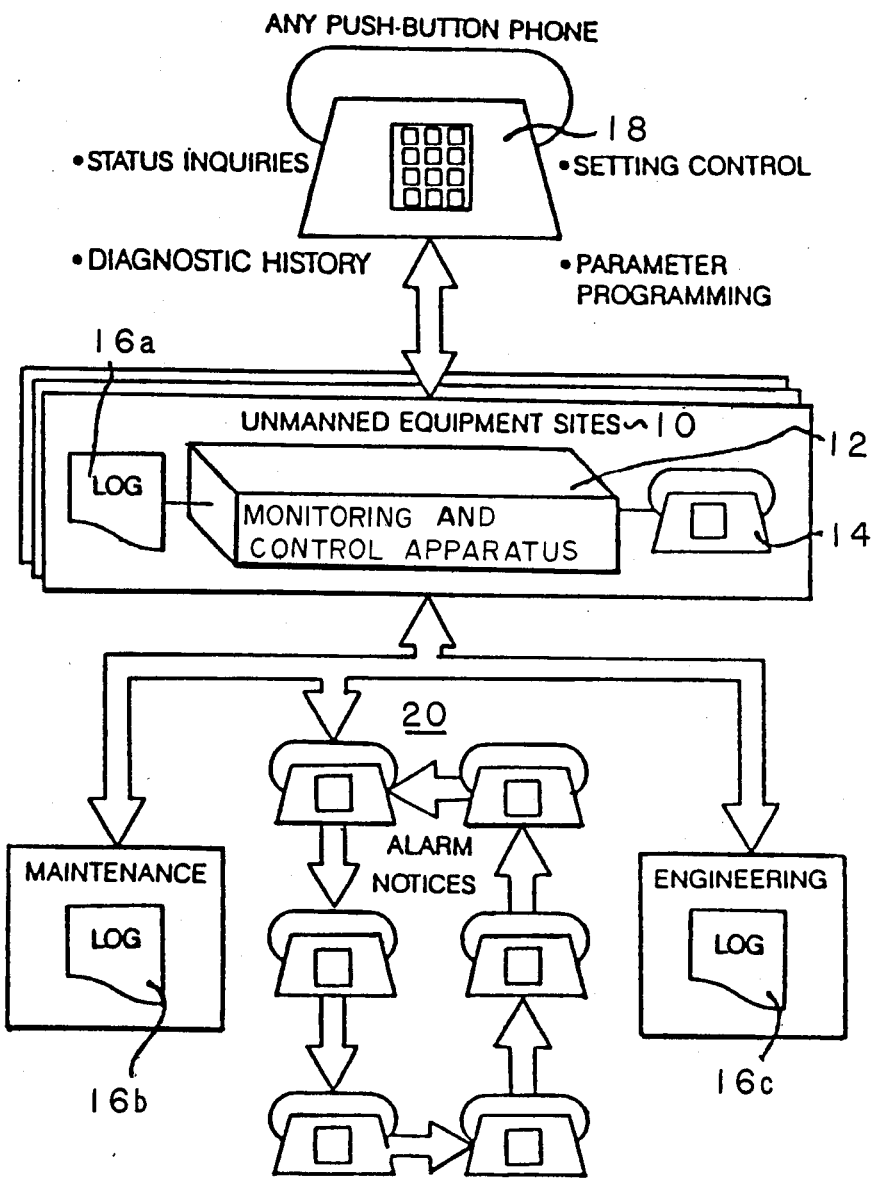
FIG. 1 is a block diagram of a complete system using the remote supervisory and monitoring system of the invention.

FIG. 1 illustrates in diagrammatic form a system arrangement which utilizes the supervisory monitor and control system of the invention. Remote operating site 10, at which is located a monitoring and control system 12 which is constructed according to the principles of the invention, may include any form of equipment which requires monitoring of its operating parameters. In addition, at the remote site is a conventional push-button telephone 14 connected to system 12, and a printer 16 similarly connected to system 12.

Push-button telephone 18 which is shown to be in two-way comunication with system 12 may be any push-button telephone located anywhere in a public telephone system. As indicated, a user may perform any of four functions from the push-button telephone. After accessing system 12 through the use of a password, an inquiry may be made as to the status of the various operating parameters and alarm conditions. If desired, the operator, again through the transmission of an appropriate code to the system 12, can obtain a recent maintenance history of the monitored site. This history contains a listing of alarm conditions, including alarm port and alarm description, date and time, alarm duration in days, hours, minutes and seconds, along with the operator's identity number and site identification. If it is found that the monitored equipment is operating improperly or other forms of operation or parameter changes are needed, system 12 may be programed from the push-button telephone to achieve the desired operation. Finally, should an alarm condition be noted, certain controls at the remote site can be set, either by comunicating DTMF signals from the push-button telephone to system 12 which in turn makes the appropriate switch settings to carry-out the control function or by automatic mode. In automatic mode the alarm condition is programmed to set certain controls without operator intervention.

A plurality of telephones 20 are additionally shown in FIG. 1. Should system 12 note an alarm condition, it can be programed to call in sequence, in this example, up to six telephones at any six locations to attempt to reach a user who can take the appropriate steps to correct the condition. when one of the users is reached, as discussed above, he may request additional diagnostic information by simply using the telephone keypad. The user may also direct a control function to initiate remote testing and to switch to standby equipment.

Every transaction may be logged on printer 16(a) at the equipment site, and at the same time transmitted to printers 16(b) and 16(c) at any other locations with a telephone. Logged information includes, for example, time to the nearest second, site identification, alarm port and activity description, date and the individual involved in the operations.

Figure 2A:
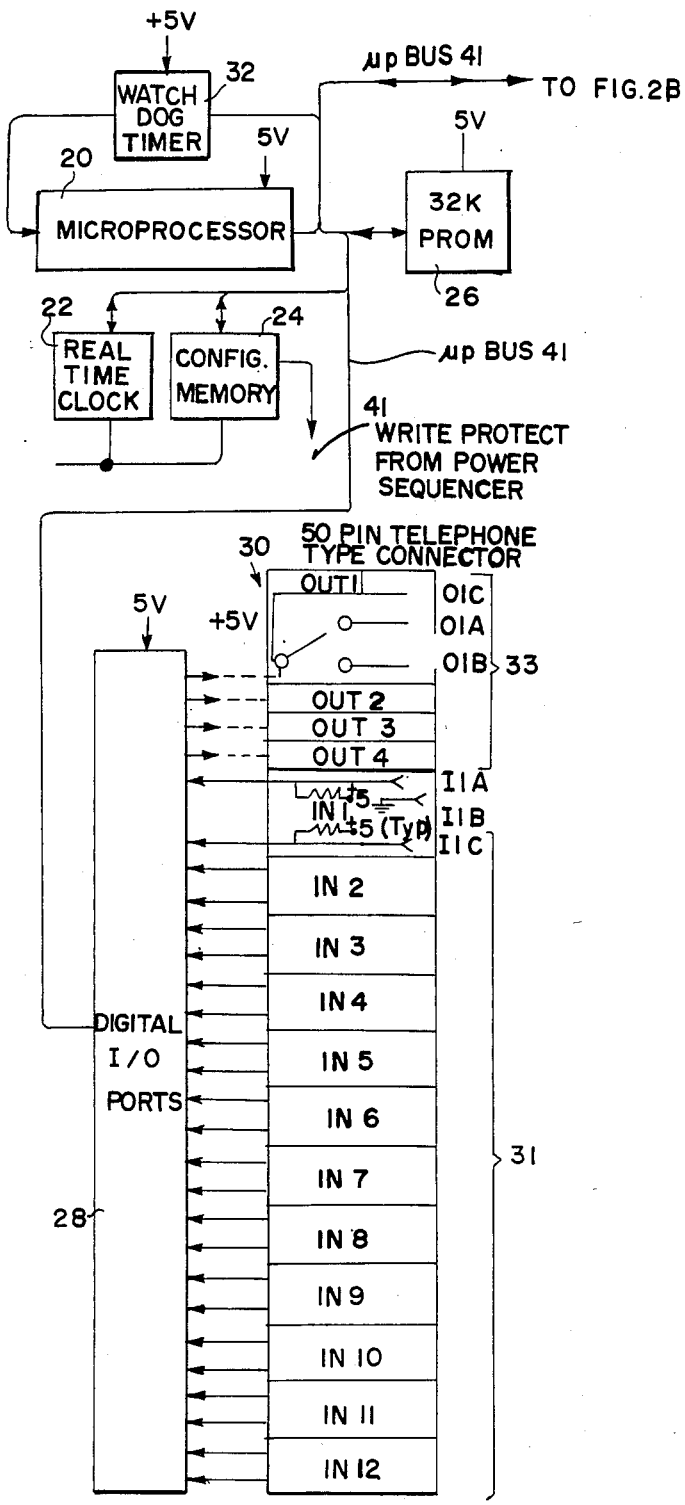
FIGS. 2A–C are to be taken together and are a detailed schematic diagram of a preferred embodiment of a remote supervisory system in accordance with the principles of the invention.
Figure 2B:
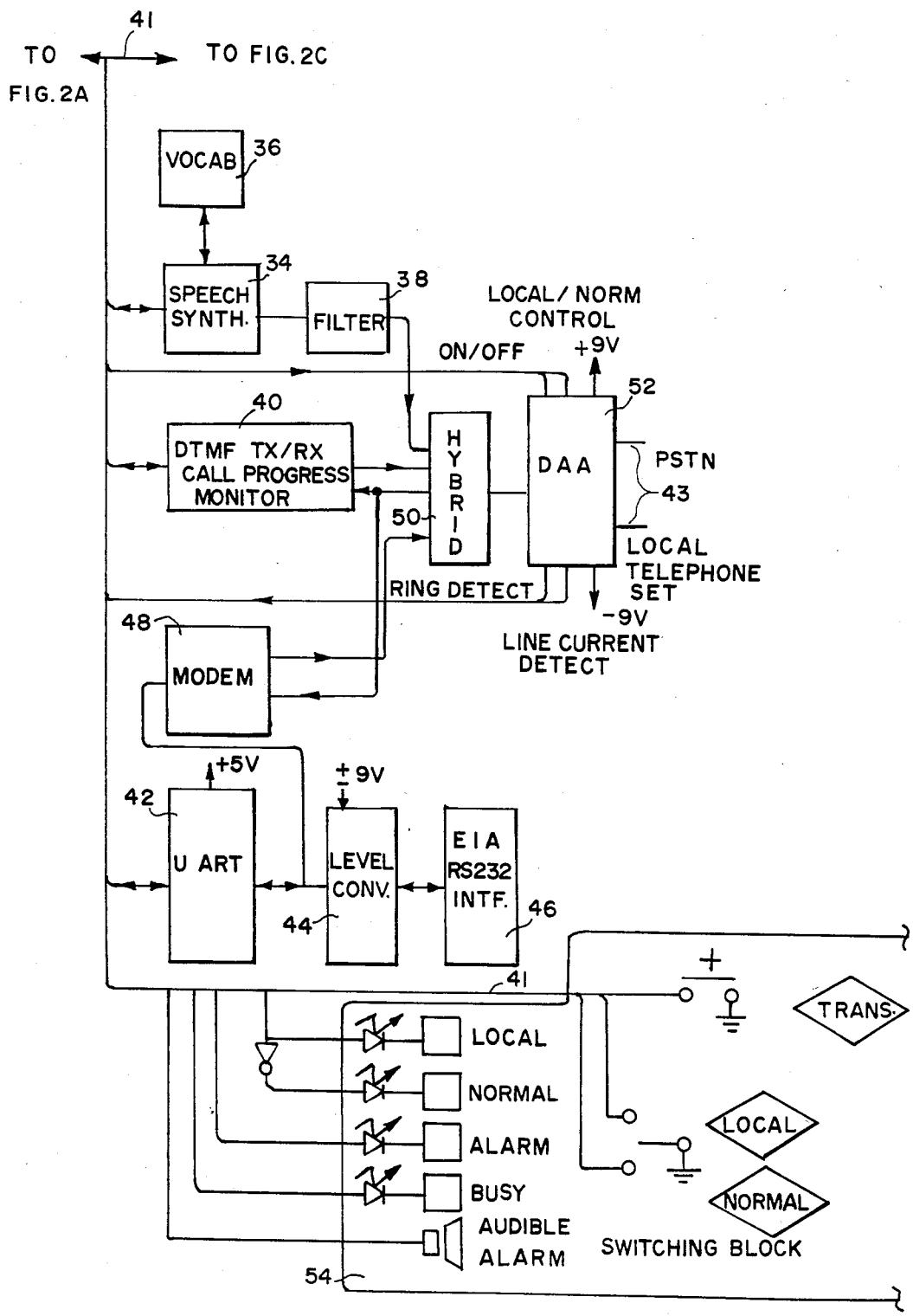
Figure 2C:
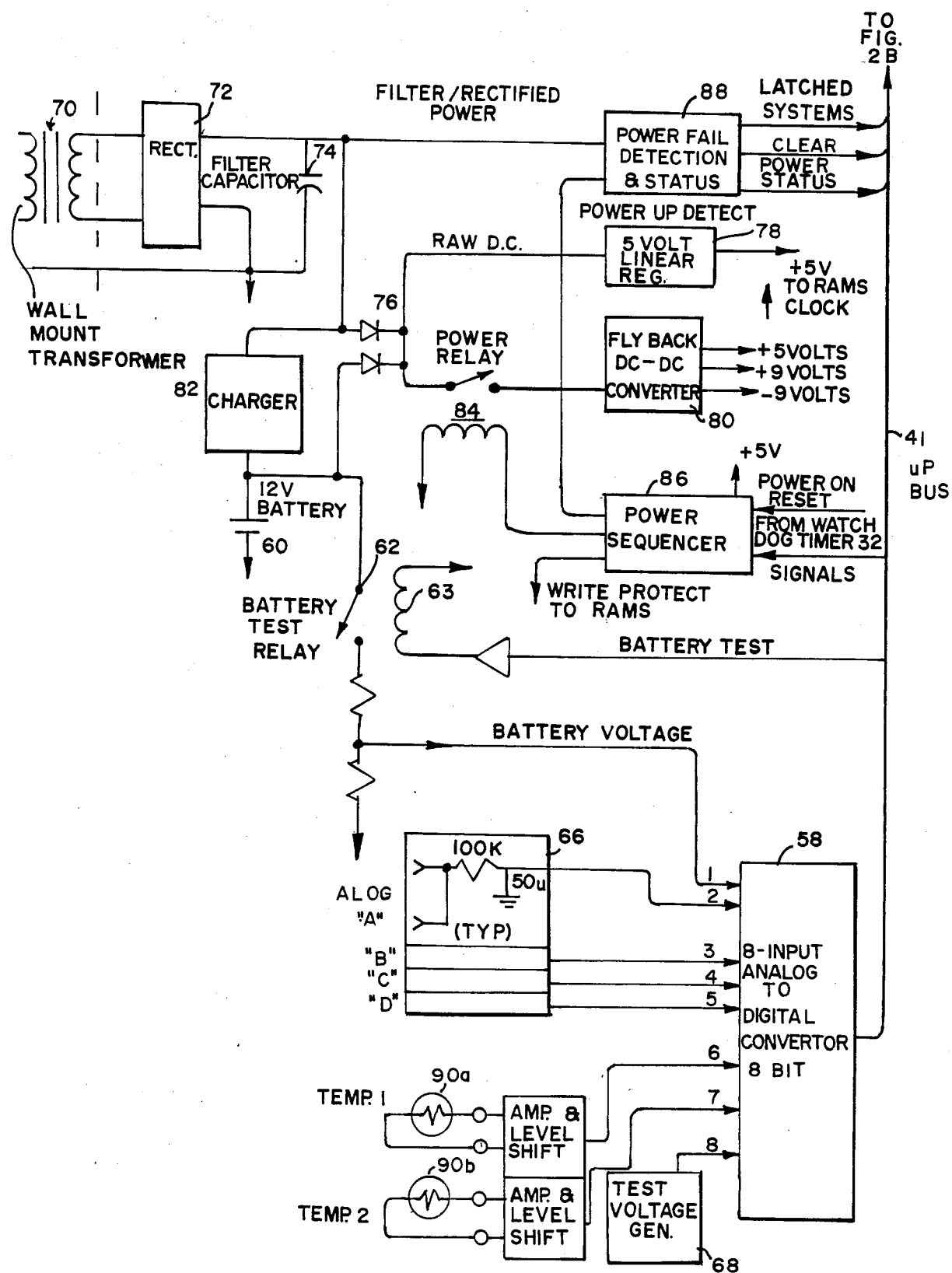

In FIG. 2 is shown a detailed schematic diagram of a preferred form of construction of system 12.

The entirety of the operations of system 12 are monitored and controlled by means of a conventional microprocessor 20 which in this example is a NSC8OO chip manufactured by National Semiconductor Corporation. The microprocessor 20 in conjunction with memory and input/output devices form the hardware of the invention. The devices are all connected together by the microprocessor bus 41. The microprocessor executes a program stored in memory 26 and has configuration parameters stored in memory 24. Block 24 is random access memory (RAM) for storage of various variables and parameters. The remaining devices connected to the microprocessor bus are input/output devices and are used in this combination to form the supervisory monitor and control system.

A real time clock is used to provide time and date status to the software. It also provides interrupts to the microprocessor to initiate sensor scanning. The real time clock 22 is implemented in hardware and connected to the microprocessor bus.

A watchdog timer 32 is used as a safeguard device to ensure that the microprocessor 20 is properly executing the program. The watchdog timer 32 must be serviced at strict time intervals. If it is not serviced at strict time intervals it is indicative of the microprocessor 20 not executing the stored program properly and the watchdog timer 32 will reset the microprocessor 20.

A block of digital input/output ports is shown at 28. These are connected to the microprocessor 20 via data bus 41. In this embodiment the block of digital input-/output ports 28 interfaces through a standard 50-pin connector 30 which in this case contains twelve alarm inputs 31 and four control output 33.

Another device which might be referred to as another input/output device is a speech synthesizer 34 which is of conventional construction. In accordance with known programming principles the microprocessor 20 commands speech synthesizer 34 to produce various words and to form them into recognizable sentences. The vocabulary for speech synthesizer 34 is contained in a read-only memory 36. As is shown, the output of the speech synthesizer 34 is an analog signal having some energy in a frequency band which may not be accommodated by the telephone system. Accordingly, a filter 38 may be provided, as needed, to limit the speech synthesizer 34 analog output to the frequency band width of the telephone system to which system 12 is connected.

A dual tone, multi-frequency (DTMF) transceiver 40 of known construction is provided. In this example it is constructed from a type 20C90 chip, as manufactured by Silicon Systems Inc. The receiver portion of the element 40 receives dual tone, multi-frequency signals from a push-button telephone anywhere in the telephone network to receive various commands to cause the system to perform the various functions described hereinabove in connection with FIG. 1. As will be discussed, the user might be provided with a command menu which will guide him in providing the appropriate comands. The transmitter portion of element 40 permits dialing through the public telephone network. Transceiver 40 also includes a call progress monitor which is used in the dialing process to detect the various states during a call such as a dial tone, busy, ring back and the like. If, for example, a busy tone is detected the microprocessor 20 will detect it, and the call will be placed later. When a dial tone is detected, element 40 dials and then waits for ring back or a busy signal. The call progress monitor also detects the absence of ring back, i.e., the operator answering the telephone.

Another input/output block connected to microprocessor bus 41 is a universal asynchronous receiver transmitter (UART) 42 of conventional construction; in this example it is 7 a type NSC 858 chip manufactured by National Semiconductor Corporation. As is known, this device is used for transmitting serial data. It is a single channel UART with a baud rate generator on the chip. As shown, element 42 connects to a level converter 44, which converts the signals to a level compatible with a standard EIA/RS232 signal output at EIA/RS232 interface 46. UART 42 also is directly connected to a conventional modem 48. This modem serves to transmit bit serial data from UART 42 through the telephone line 43.

As illustrated, speech synthesizer 34, DTMF transceiver 40 and modem 48 each have analog outputs, and are ultimately coupled to the public switched telephone network connected to by lines 43. The input/output ports of the foregoing components are connected, respectively, to a conventional hybrid circuit block 50. As is shown, a hybrid, such as element 50, is used to convert a standard two-wire interface from the public telephone network to a transmit and receive path. In this case the transmit path is from the hybrid to the telephone network. This path comprises the output from speech synthesizer 34 and its filter 38, the output of modem 48 end the output from DTMF transceiver 40. The receive output of the hybrid 50 provides the inputs to the modem 48 and the DTMF transceiver 40. These inputs end outputs are coupled through the hybrid 50, are converted in the known manner, end sent to a data access arrangement. This data access arrangement (DAA) 52 is a known device required in the United States by the Federal Communications Commission to comply with a rule known as FCC part No. 68 for connections to public switched telephone networks. In essence, this element provides isolation to protect the telephone network from any electrical eccentricities of system 12.

Control signals to the DAA 52 effect off-hook control, and with this control the microprocessor 20 can connect the system (12) to the DTMF for dialing or answering calls. Control signals from DAA block 52 are the ring detect and line current signals. The line current detect indicates that either system 12 or the local telephone set are off hook. The ring detect signal indicates that the public network is ringing system 12, by simply ringing its telephone number.

The data access arrangement (DAA) 52 can be controlled by a switch identified as a local/normal control in switching block 54. This switch performs the function of switching the local telephone set (not shown) from the switched network.

It can be said that switching block 54 is an interface between system 12 and a human operator. At this point the operator can interact locally with system 12. The local and normal indicators in switching block 54 indicate system 12 is in the local mode in connecting a local telephone set and system 12. In the normal mode communications flow between the remote location which system 12 is monitoring end the public telephone network. The local-normal toggle switch in switching block 54 is used to place a system 12 either on the public network or directly connected to the local telephone. A transfer request to this switch is used when the local operator picks up the ringing phone to form a system 12 call. The local operator may push the transfer switch in switching block 24 and hang-up his phone to put system 12 in contact with the remote caller.

The alarm indicator in switching block 54 will blink if there is an unacknowledged alarm. It will be on for an acknowledged alarm end off if no alarm is present. The alarm indicator is also used to indicate that the self-check or system check has, as detected by microprocessor 20, determined the existence of an error or defect in system 12 itself.

The busy indicator in switching block 54 indicates that system 12 is off hook, either communicating locally through an operator or remotely through the telephone network. The audible alarm portion in switching block 54 is used by system 12 to alert a local operator, if one is present, to pick up the telephone set at the remote site in the local mode.

The last remaining input/output block connected to microprocessor 20 by date bus 41 is the analog-to-digital converter 58. This chip is a type ADC0809 manufactured by National Semiconductor Corporation. It contains a multiplexer for selecting 1 of 8 analog inputs, and conversion is carried out by the successive approximation technique. In this embodiment the digital output from the converter is eight (8) bits in width. Its function is to receive analog signals from various sensors at the remote site end convert them into digital information for use by microprocessor 20.

Input No. 1 to converter 58 receives voltage from a battery 60 through battery test relay 62. Coil 63 of battery test relay 62 is periodically energized from a signal received over microprocessor bus 41 from microprocessor 20. The test relay operates to periodically test the state of charge of system battery 60. Inputs 2, 3, 4 and 5 to converter 58 are from circuit block 66 which is in turn connected to analog sensors (a), (b), (c) and (d). These sensors, for example, are, respectively, the appropriate types to detect such parameters as voltage, pressure, speed, chemical content or the like. This analog information is then communicated to converter 58, converted to the appropriate digital information end communicated vie bus 41 to microprocessor 20.

Inputs #6 and #7 to the converter 58 are analog voltages representing the temperatures sensed by sensors 90A and 90B. The signals from the sensors are conditioned by the amplifiers and level shifters #22. This must be done to make these signals usable by the converter.

A test voltage generator 68 is provided on output #8 and is used to test the calibration of the converter 58, under the control of microprocessor 20.

The power supply components for system 12 supply normal power from a flyback converter 80 plus an uninterruptable power from a 5-volt linear regulator signal which is labelled as +5 VA. The 5-volt linear regulator 78 supplies power to configuration memory 24, which is a non-volatile memory block. Similarly, it supplies power to the real time clock 22, and the power sequencing circuit 86 which must receive power at all times.

The power for the system 12 is provided from the alternating current mains by means of a wall-mount transformer 70. The output of this transformer proceeds through a rectifier 72 end filter capacitor 74. The rectified and filtered direct current produced is coupled through a set of isolation diodes 76 to supply current to a 5-volt lineer regulator 78 of conventional construction and a flyback DC-DC converter 80. The various sources of power at the illustrated voltages emanate from the latter two components.

A battery charger 82 charges battery 60 and maintains a constant voltage on the battery in the known manner. Power relay 84 controls flyback DC-DC converter 80, and is used to deactivate system 12 in case of a prolonged power outage. In the event of a power outage, after system 12 has performed all its alarm and logging functions the system will deactivate itself by cutting off power to the DC-DC converter 80. If the flyback DC-DC converter 80 is disabled, the 5-volt linear regulator 78 which provides nonvolatile power will not be disabled. Flyback DC-DC converter 80 can be formed from any of a variety of known circuit devices, e.g., a Lambda type Las 6320 controlled circuit. It performs a switching function at a rate of thousands of times per second to perform pulse width modulation. A flyback converter of this type is characterized in that its output power is derived from inductively stored energy and is transferred when the transistor switch is turned off.

Power relay 84 disables the flyback DC-DC converter 80 and is controlled by power sequencer 86 which is in turn under the control of microprocessor 20. This device performs the function, when necessary, of cutting off power to flyback DC-DC converter 80 and to restart the system when alternating current power is reapplied. It also performs "write protect" for nonvolatile memory. As well, it protects random access memory 24 during power outage and during reset. Power sequencer 86 is formed by a logic circuit which compares power conditions to produce the desired result.

A power failure detection end status circuit 88 provides detection of intermittent AC power. The same circuit also detects when the power is reapplied. The detection of an intermittent outage is performed by a latch and must be cleared by the microprocessor 20. The power failure and status circuit includes logic components of a conventional nature which detect the presence or absence of A.C. power to provide outputs indicative of power status.

Using conventional programming techniques a primary function of system 12 is to continuously monitor the status of user equipment at the remote site in order to detect and act upon the presence of fault conditions. This is done by sampling digital and analog input signals received through converter 58 and comparing the results with programmed criteria. In addition, system 12 continuously monitors its own environment indicating parameters such as temperature and power availability.

All faults that are detected by the status monitoring facility are subjected to a screening process that determines whether or not the fault is to be reported to an operator. This screening process, referred to herein as alarm management, is discussed hereinabove.

The system of the invention can monitor the status of any user equipment providing either form "C" or form "A" alarm outputs. In this embodiment up to 12 such signals are supported by a single system 12.

The input signals are referred to as signals 1 through 12 appearing at 50-pin connector 30. The type and significance of each input signal are determined by the user at any time through programming. The correlation between an input signal and user equipment is transparent to the inventive system.

The system of the invention is capable in the known manner of detecting and acting upon transitions in the state of each individual digital input signal. The system periodically scans the input signals to sense any two consecutive changes in state. Unused signals are not scanned.

The system of the invention can monitor up to, in the preferred embodiment, four user-supplied analog signals. These signals are fed through the system using conventional BNC connectors mounted on the rear panel. The significance of these levels is determined by the user at any time through programming. The correlation between a connector and a particular signal path (e.g., transmit or receive) is transparent to the system.

The system periodically converts the analog signals to digital values in the range of 0 to 150, and unused analog inputs are not scanned.

On a per signal basis the user can specify a range of normal values. Values that are above or below the range for two consecutive scans are considered to indicate a fault condition. A fault condition is considered to be cleared only after the signal has returned to and stayed in the normal range for two consecutive scans. If desired, these transitions into and out of fault conditions can be logged on a printer such as printer 16. Each analog input signal can be associated with a corresponding control output signal such that the presence or absence of a fault on the input signal determines the state of the output port. The system can be interrogated for the current value of each analog signal, and the value reported shall be the last sampled value.

Temperature sensors 90(a) and 90(b) are provided as a feature of the system. The significance of these sensors is determined by the user at any time through programming. The user may specify a normal range for each temperature sensor, and temperature readings above or below the normal range for two consecutive scans constitute a fault condition. Similarly, a temperature fault is cleared when the temperature returns to and stays in the normal range for two consecutive scans.

The system of the invention utilizing real clock 22 maintains an on-board clock and calendar. The date and time can be set as often as desired as part of the programming function. The system can be queried for the date and time as part of the status reporting function.

As result of the aforementioned status monitoring, the system of the invention may detect any or all of the following faults:

A. Temperature (from the temperature sensors too high or too low);

B. AC power loss;

C. System test failures such as weak battery, conversion error, printer off-line or nonfunctioning nonvolatile memory failure and tone generation decoding failure;

D. Digital input signals 1 through 12 including invalid form C, fault condition or disconnection; and, E. Analog input signals a through d as either too high or too low.

Each fault that occurs is subjected to a screening process through conventional programming of microprocessor 20 which determines whether or not the fault is to be automatically reported to an operator. It should be noted that it is not possible to screen out power failure faults or self-test failures. For each monitor point the user programs, (a) whether or not a fault condition on this monitor point is ever to be reported and (b) how long the fault condition must be present before it is reported to an operator. A fault condition present for the minimum specified duration is considered to be an alarm condition.

An alarm is considered to be active as long as the fault condition on the monitor point remains.

When an alarm condition occurs, the system of the invention automatically dials a programmed telephone number, or numbers, identifies itself to the operator and reports significant information using voice synthesis.

In accordance with its principles of operation the system of the invention requires that each alarm be acknowledged by an operator using the telephone keypad. It will continue to dial a primary and up to a given number of telephone numbers until the alarm is acknowledged or all phone numbers have been tried a specified number of times. Unsuccessful reporting of an alarm is noted by the system end is logged on the printer. The log entry includes the identification number of the responding operator. Operators can receive alarms without acknowledging them. In such a case the system continues to dial alternate numbers until the alarm is acknowledged or the retry count is exhausted.

When the detection of a single alarm triggers an outgoing call, the bus status monitoring is not suspended. Thus, by the time an operator is reached, there may be more then one alarm to be reported. Conversely, the fault condition that generated the alarm may have already been corrected. For this reason, the occurrence of an alarm condition is recorded in a time ordered manner. In its random access memory the system maintains information about an alarm condition as long as the alarm condition is still active and has not been acknowledged, or it is one of the last ten past alarms. Past alarms are presumed to have been both cleared and acknowledged. At least ten unacknowledged alarms shall be maintained in memory.

When dialing out, the system of the invention shall automatically report all unacknowledged alarms whether or not they are currently active. The last ten past alarms can be obtained through the status reporting function. The same is true of active alarms that have already been acknowledged.

In the preferred embodiment the alarm records include the following information: (a) monitor point, (b) alarm condition, (c) date and time of detection, (d) date and time cleared (if cleared) (e) the identity of acknowledging operator (if acknowledged) and (f) site identification.

Status is reported to operators upon demand. Status reports can be selected individually for each of the following: (a) date and time, (b) temperature readings, (c) active alarms, (d) alarm history for the past ten alarms, (e) individual digital input states, (f) individual analog input values, (g) individual digital output states, (h) battery charge, and (i) system test.

An operator can obtain status by dialing the system and identifying himself using a "password". Status queries can also be made if the system dials the operator, in which case the operator is given a choice after all unacknowledged alarms have been reported. The status reporting function allows the operator to monitor equipment after an alarm has been reported. It also allows the operator to check the status of input signals that are not configured to generate alarms. Such signals may be ones that have significance only in diagnostic modes.

An important function of the system of the invention is the programming function. That is, according to the principles of the invention the system can be programmed to meet specific requirements for each installation. This can be done by authorized users as often as desired from a telephone keypad at any location. As with other functions, authorization to change system parameters is controlled via a programmer password. The system's microprocessor 20 controls a voice synthesizer 34 to report the current programming parameters and to prompt new input. Validity checks are performed on operator responses. For all programmable parameters default values are predetermined and will be in effect until the unit is programmed otherwise. Changes in programmable parameters may be logged on a printer.

As a result of the aforementioned programming function, the system of the invention may be programmed with any or all of the following paremeters:

(a) System Identification (identifies the individual unit to the operator using synthesized voice and prints the identification on the printer);

(b) Printer Paremeters (sets printer control, i.e., supervised site or remote, disable/enable and telephone numbers of remote printers);

(c) Passwords (operator passwords and the operators to which they were assigned and programmer passwords and the programmers to which they were designed);

(d) Telephone Paremeters (the telephone numbers to be called in case of an alarm and the sequence they are to be called, the type of telephone, i.e., pulse or tone, the number of auto-dial retries in case of an uncompleted call, and the number of rings before system 12 auto-answers);

(e) Digital Alarm input Paremeters (enable/disable the port and/or alarm, set type, i.e., from "A" or "C", set normally open or closed, and duration in seconds before making alarm phone call);

(f) Analog/Temperature input Paremeters (enable/disable the port and/or alarm, set type, i.e., "A" or "C", set high and low thresholds, and the duration in seconds before making alarm phone call);

(g) Control Output Parameters (enable/disable, set user control or automatic, and normally open/closed);

(h) Setting Date and Time; and (i) Enable/Disable Autodial.

Calls to the system 12 of the invention can be initiated from any telephone. The call begins with a known "hand shaking" protocol. The system uses voice synthesis to announce its identification and to request a password. The identification number is specified by the user, and up to ten digits may be specified. After this introduction the system controls progress of the call by prompting for input and processing DTMF tones according to its current state. The operator is given sufficient flexibility to choose the order in which actions are taken; status queries, equipment control and programming commands can be utilized in any order.

The system will remain off hook until the operator explicitly releases control or until two minutes have elapsed since the last operator response. The operator is warned before the call is disconnected.

The system of the invention can dial out using either tone or pulse codes. The mode may be set at any time by programming. The system maintains a directory of telephone numbers in the memory and these numbers are specified by the user and can be changed as often as desired.

On out-going calls the system 12 dials the number and uses call progress monitoring to detect when the called phone goes off hook. If the line has not gone off hook after a specified time, the system 12 hangs up and dials another number if the user-specified retry count has not expired.

The system also uses its auto dial capabilities to send information to a remote printer. The telephone number of each remote printer is specified to the system 12 by the user.

Using call progress monitoring the system can detect incoming calls and go off hook after a user-specified number of rings. Upon receiving an in-coming call the system identifies itself and prompts the operator to do the same. An operator that provides either a valid operator password or the programmer's password is allowed to issue commands and acknowledge alarms. An operator that gives the generic operator responses is only allowed to hear unacknowledged alarms.

Using a predetermined vocabulary through speech synthesizer 34, the system synthesizes voice in order to identify itself, report status, report alarms, and prompt the operator for DTMF inputs. Voice is used only for calls to the operators. It is not used to send information to the printer.

The system is capable of decoding all 16 DTMF tones in the known manner, and these tones are interpreted according to the current state of the call in progress. DTMF tones are accepted on both auto answer and auto dial calls. They are genereted by the operator to query for status, program the system and control the output ports.

The system can detect DTMF tones any time during an off hook condition. Depending on its current state, it may or may not defer processing of the tone until it has completed its current speech output.

Using conventional programming techniques, access to information and control capabilities of the system are secured by operator passwords. Upon dial out or answering a call the system will identify itself and request the operator to do the same, and the system 12 will disconnect if no valid response is entered within, in this case, two minutes.

In the preferred embodiment there are three levels of privilege.

(1) If no operator password is specified, the system will provide only the list of unacknowledged alarms. It will not consider the alarms to be acknowledged. Any logged events requiring operator identification will use the number 0 to identify a respondent who did not provide a password.

(2) If a confidential operator password is entered the operator will be able to acknowledge alarms, control equipment and obtain status. Each system of the invention can be programmed to recognize a predetermined number of operator passwords. These passwords uniquely identify an operator.

(3) The highest privilege level is that of a programmer. A single programmer password can be specified for each system unit. A respondent that enters the programmer password will be allowed to change parameters as well as obtain status, acknowledge alarms and control equipment. It should be noted that all passwords are programmable, and only a respondent using the programmer password can change any of the passwords.

As indicated in the drawings, the system may communicate with a printer locally attached via serial interface and/or with up to two remote printers. In the case of a remote printer the system dials the number of a printer with an auto-answer modem and reports information using standard modem tones. As the system is programmed, log printer entries are generated for the following events: (a) fault detection, (b) fault clearing, (c) alarm condition, (d) alarm clearing, (e) equipment control, (f) program parameter change, and (g) auto dial enabled/disabled.

If log entries occur at a faster rate than they can be printed, up to a maximum of twenty (20) events will be buffered. All logged events will include a time stamp to the nearest second of when they occurred.

It is to be understood that the specific construction and principles of operation of the system described hereinabove are considered only to be examplary of the principles of the invention. It is to be understood as well that a variety of modifications and changes in the described system can be used while remaining within the scope of the invention as defined in the appended claims.

What is claimed is:

1. Apparatus which monitors and controls equipment at a remote site, said apparatus comprising::

monitoring means for sensing conditions at a plurality of monitored points in equipment at a remote site and for producing data signals representing the sensed conditions;

programmable microprocessor means for controlling the operations of said apparatus in an operator-controlled mode and in an automatic mode, for receiving and storing data signals of said monitoring means, for producing alarm signals representing alarm conditions when the data signals of said monitoring means reach predetermimed values, and having output ports connected to circuits for controlling output parameters and carrying out equipment control functions to correct the alarm conditions;

transmitting means coupled to a public telephone net-work for producing and transmitting thereover a predetermined sequence of dual tone multi-frequency (DTMF) signals responsive to receipt of an alarm signal from said microprocessor means;

voice synthesizer means operable responsive to the alarm signal and an off hook condition of a telephone connected to the public telephone network for producing and transmitting over the telephone network an oral announcement of an alarm condition corresponding with an alarm signal;

receiving means for receiving DTMF signals produced by an operator of the off hook telephone, said apparatus having multiple privilege levels including an operator privilege level established when DTMF siqnals coupled though said receiving means are in the form of a prescribed operator privilege code and a programmer privilege level established when DMTF signals coupled through said receiving means are in the form of a prescribed programmer privilege code, and said apparatus having a different response to received DTMF siqnals depending on which privilege level is established in the apparatus;

said microprocessor means including means for communicating data signals and alarm signals to said voice synthesizer means, said voice synthesizer means, responsive thereto, producing and transmitting over the public telephone network to an operator of the off hook telephone an oral announcement of the sensed equipment conditions including status reports of predetermined sensors and alarm conditions;

said microprocessor means including means, operable when said apparatus is in the operator-controlled mode and after the operator privilege level has been established, for receiving subsequently transmitted DTMF signals representing desired states of said output ports of said microprocessor means and circuits connected thereto, and for setting said output ports of said microprocessor means and circuits connected thereto in the desired states to control output parameters and carry out equipment control functions in accordance with the contents of the subsequently transmitted DTMF signals;

programmable memory means in said microprocessor means for storing instructions and parameters for operation of said microprocessor means in both the operator-controlled mode and the automatic mode, instructions stored in said memory means comprising programs used by said microprocessor means in both the operator-controlled mode and the automatic mode to monitor the status of equipment at the site, to detect alarm conditions based upon a comparison of the data signals produced by said monitoring means with the predetermined values, the predetermined values comprising input parameters stored in said memory means, and to generate alarm signals if the comparison detects alarm conditions;

instructions stored in said memory means also comprising programs used by said microprocessor means in the operator-controlled mode to set said output ports to control output parameters and carry out equipment control functions responsive to DTMF signals produced by the operator of the off hook telephone;

instructions in said memory means also comprising programs used by said microprocessor means in the automatic mode without operator intervention to set said output ports to control output parameters and carry out equipment control functions responsive to an alarm condition;

said microprocessor means including means operable after a programmer privilege level is established in said apparatus, for receiving subsequently transmitted DTMF signals to set said apparatus in either the automatic or operator-controlled modes and, when representing modifications to or changes in instructions and input and output parameters including privilege level codes, to reprogram said memory means in accordance with the contents of the last-mentioned subsequently transmitted DTMF signals.

2. An apparatus according to claim 1 wherein said microprocessor means is programmed to detect operator-generated incoming DTMF signals at any time during an off-hook condition and to process the incoming signals to reprogram said memory means while the apparatus is performing its monitoring and control operations.

3. An apparatus according to claim 1 wherein said microprocessor means is programmed to perform validity checks on operator-generated incoming DTMF signals.

4. An apparatus according to claim 1 wherein said microprocessor means is programmed to detect operator-generated incoming DTMF signals and to process the incoming signals to initiate remote testing of the apparatus.

* * * * *